(12) United States Patent
Hänsel et al.

(10) Patent No.: US 6,540,232 B2
(45) Date of Patent: Apr. 1, 2003

(54) ARTICULATED FITTING FOR A VEHICLE SEAT

(75) Inventors: Richard Hänsel, Flonheim (DE); Wolfgang Boltze, Kaiserslautern (DE); Eckhard Nock, Worms (DE); Mario Klein, Kaiserslautern (DE)

(73) Assignee: Keiper GmbH & Co., Kaiserslautern (DE)

( * ) Notice: Subject to any disclaimer, the term of this patent is extended or adjusted under 35 U.S.C. 154(b) by 0 days.

(21) Appl. No.: 10/014,761

(22) Filed: Dec. 11, 2001

(65) Prior Publication Data

US 2002/0050733 A1 May 2, 2002

Related U.S. Application Data

(63) Continuation of application No. PCT/EP01/03938, filed on Apr. 6, 2001.

(30) Foreign Application Priority Data

Apr. 12, 2000 (DE) .......................................... 100 18 125

(51) Int. Cl.[7] ................................................. B60N 2/20
(52) U.S. Cl. .............. 277/367; 297/378.12; 297/378.14
(58) Field of Search ............................. 297/367, 378.12, 297/378.11, 378.14

(56) References Cited

U.S. PATENT DOCUMENTS

| | | | |
|---|---|---|---|
| 4,836,608 A | 6/1989 | Sugiyama | |
| 5,154,476 A | 10/1992 | Haider et al. | |
| 5,540,117 A | 7/1996 | Hansel et al. | |
| 6,139,104 A | * 10/2000 | Brewer | 297/378.12 |
| 6,139,105 A | * 10/2000 | Morgos et al. | 297/367 |
| 6,209,955 B1 | 4/2001 | Seibold | |

FOREIGN PATENT DOCUMENTS

| | | | |
|---|---|---|---|
| DE | 7306501 U | 6/1973 | |
| DE | 2414910 | * 10/1974 | 297/367 |
| DE | 3828659 A1 | 3/1989 | |
| EP | 0738624 A1 | 10/1996 | |
| EP | 0776781 A2 | 6/1997 | |
| EP | 0928717 A1 | 7/1999 | |

* cited by examiner

*Primary Examiner*—Peter R. Brown
(74) *Attorney, Agent, or Firm*—Alston & Bird LLP

(57) ABSTRACT

In an articulated fitting (1) for a vehicle seat, in particular for a motor-vehicle rear-seat bench, having a lower fitting part (5) and an upper fitting part (8), which can rotate relative to the lower fitting part (5), for attaching the backrest of the vehicle seat, the backrest (4) being pivotable by means of the articulated fitting (1) between at least one upright seat position, which can be locked by means of the articulated fitting (1), and a flat table position and/or lying position, which can be secured by means of the articulated fitting (1), a control cam (24) is provided on one of the two fitting parts (8), said control cam interacting with a control element (23) of the upper fitting part (5) in order to control the locking and/or securing by the articulated fitting (1).

20 Claims, 3 Drawing Sheets

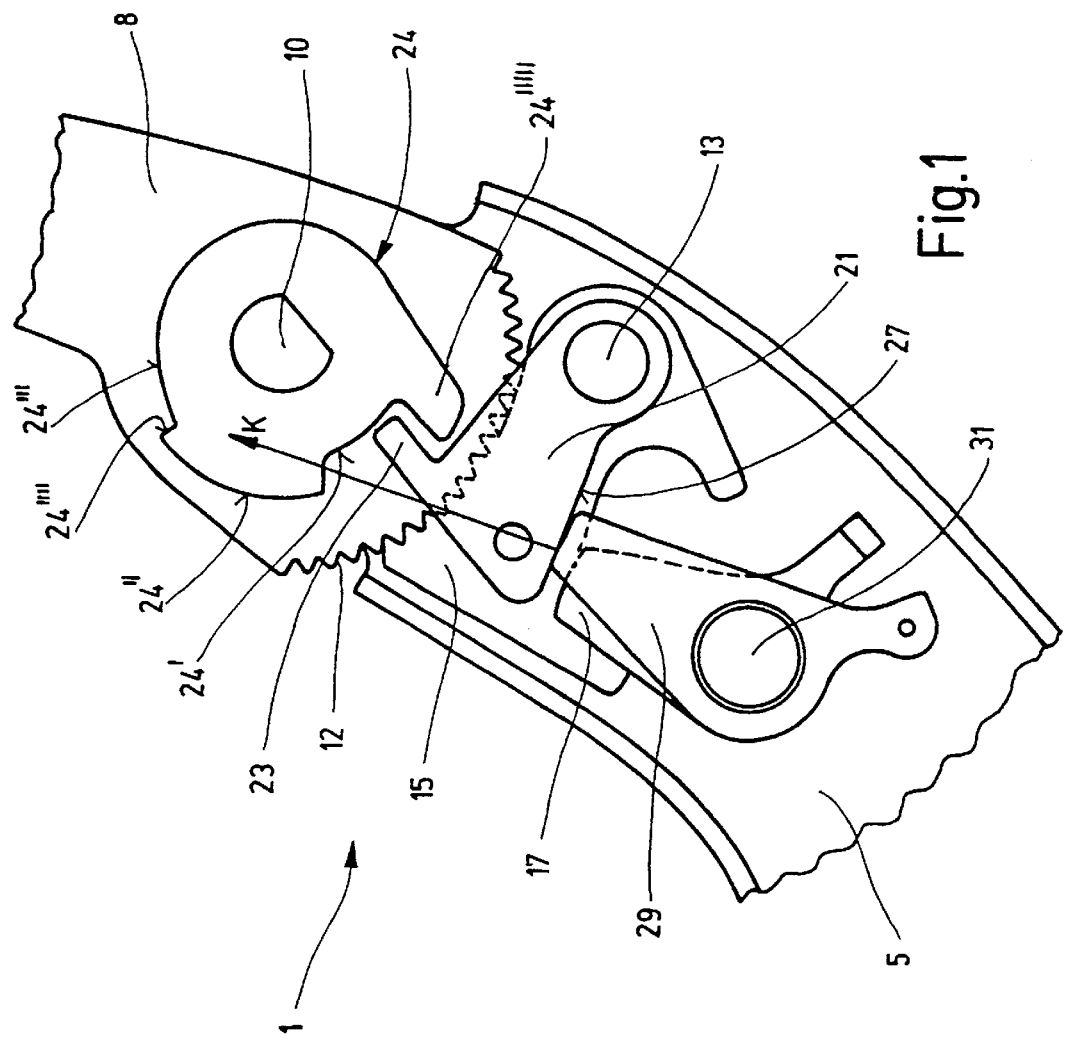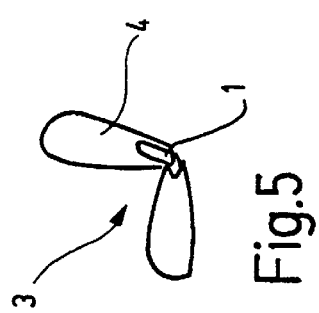

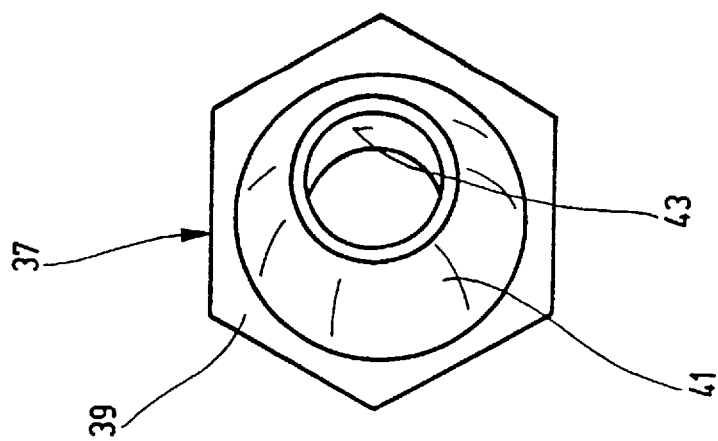
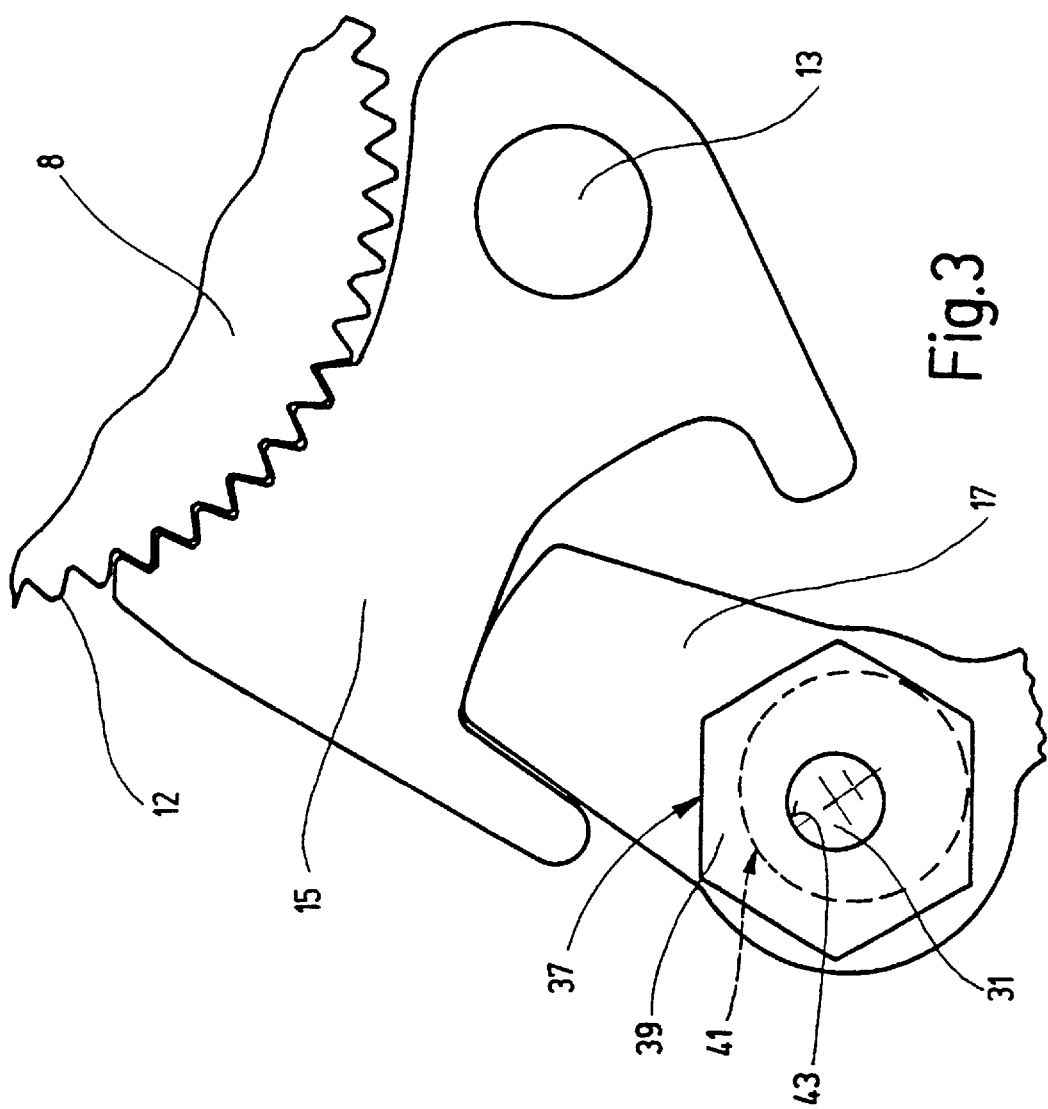

ARTICULATED FITTING FOR A VEHICLE SEAT

CROSS-REFERENCE TO RELATED APPLICATION

This is a continuation of International Application No. PCT/EP01/03938, filed Apr. 6, 2001, and designating the U.S.

BACKGROUND OF THE INVENTION

The present invention relates to an articulated fitting for a vehicle seat, and to a vehicle seat having the articulated fitting.

With a known articulated fitting, the backrest of a vehicle seat in the rear of a motor vehicle can be locked in an upright seat position for people to use the seat for sitting purposes. In order to increase the loading area, the backrest can be pivoted forward into a flat table-like position.

SUMMARY OF THE INVENTION

One aspect of the present invention is the provision of improvements to an articulated fitting of the type mentioned above. According to this aspect, an articulated fitting includes upper and lower fitting parts, and the upper fitting part is for having a backrest of a vehicle seat mounted thereto. In one example, the vehicle seat is preferably rear-seat bench. The upper fitting part is mounted to the lower fitting part so that the backrest can rotate with the upper fitting part relative to the lower fitting part between at least one upright seat position and at least one other backrest position. The backrest is at least generally upright in the upright seat position, and the other backrest position is a table position, in which the backrest extends substantially horizontally, or a reclining position, in which the backrest is reclined. In accordance with this aspect, the articulated fitting further includes a control cam provided on one of the upper and lower fitting parts for interacting with a control element of the other fitting part so as to releasably secure the articulated fitting in the other backrest position. Also in accordance with this aspect, the articulated fitting includes a detent pawl pivotably mounted to the fitting part that includes the control element. The detent pawl is for moving into and out of a locking position, in which the detent pawl releasably engages the fitting part having: the control cam to releasably lock the articulated fitting in the upright seat position.

The securing of the table position by means of the articulated fitting prevents the backrest from inadvertently pivoting back, for example because of the pressure of the upholstery, which protects the transported load. The securing is to be understood as meaning that at least a rearwardly directed pivoting movement is prevented, for example by a stop or by the articulated fitting being blocked. However, there may be a certain amount of play. The same is true for a flat or oblique reclining position in which the securing is to prevent pivoting downwards. The securing may also, for example, be designed in such a manner that it prevents the backrest from pivoting forward because of a crash, in order to protect the user. By virtue of the fact that a control cam is provided on one of the two fitting parts, with the control cam interacting with a control element of the other fitting part, the locking and/or securing can be controlled by the articulated fitting. Preferably as a function of the pivoting movement of the backrest, which movement corresponds to certain sections of the control cam, in certain angular regions an unimpeded and functionally reliable locking of the articulated fitting can take place, even when the controlling components have relatively great tolerances, in other angular regions a securing can take place and in further angular regions an unimpeded pivoting of the backrest without locking can take place. In this case, the control element preferably bears at least in some sections against the control cam. Boundaries, which are designed as stops, of the various angular regions can prevent inadvertent further pivoting or pivoting back. With the articulated fitting according to the invention, there is a reduction in the structural space necessary for the installation.

In a preferred embodiment which can be produced in a structurally simple and cost-effective manner, the control cam is provided on a control plate which is arranged concentrically with respect to the axis of rotation of the upper fitting part. The control plate can be formed integrally on a fitting part, preferably the upper fitting part, or can be placed onto it and attached. Replacement of the control plate while components are otherwise unchanged or virtually unchanged enables the articulated fitting to be adapted for different applications. As a result, the production of the articulated fitting is simplified and is more cost-effective.

A control tooth is preferably provided as the control element, which interacts with the control plate, of the other fitting part. The control tooth is preferably arranged on a detent pawl for the locking of the fitting part having the control cam. In this case, the detent pawl is preferably mounted on the lower fitting part and locks the upper fitting part. The control tooth may, for example, be formed integrally with the detent pawl or may be provided on a control pawl which is formed separately and is preferably connected fixedly to the detent pawl. For the last variant, production is simplified and made cheaper.

In order to eliminate a tolerance-induced play in the bearing points, which may result in undesirable clattering, in a preferred embodiment the detent pawl locking the articulated fitting is secured by means of a moveably mounted component whose exerted force has a direction which points past the axis of rotation of the upper fitting part. The securing component then exerts on the detent pawl an additional force component which eliminates the bearing play of said detent pawl. The desired direction of force can be achieved by appropriately orientated bearing surfaces.

In the event of a crash the detent pawl locking the articulated fitting is held, preferably by positive engagement by means of a moveably mounted intercepting component, in engagement with a toothed arrangement on the fitting part to be locked. One option for reducing the loss in overlap between the locking toothed arrangements resides in this intercepting component being mounted eccentrically, for example by a bearing bolt of corresponding design. Rotating auxiliary means are preferably provided on the eccentric mounting of the intercepting component in order to set the alignment of the eccentricity relative to the detent pawl. The loss in overlap can then be reduced irrespective of manufacturing-induced tolerances.

The articulated fitting according to the invention is preferably used in a vehicle seat, in particular in a rear-seat bench in the rear of a motor vehicle, for example, of a "van", but could also be used in a front-passenger seat. The articulated fitting can have the control cam and the various play-free setting means individually or in combination.

BRIEF DESCRIPTION OF THE DRAWINGS

An exemplary embodiment of the invention is explained in greater detail below with reference to the drawings in which:

FIG. 1 shows an only partially illustrated, lateral view of the exemplary embodiment in the locked state, FIG. 3 is a partial illustration of the securing of the detent pawl, FIG. 4 is a perspective view of the mounting of the component securing the detent pawl, and FIG. 5 is a schematic side view of a vehicle seat having the articulated fitting according to the invention.

DETAILED DESCRIPTION

Figure 2:
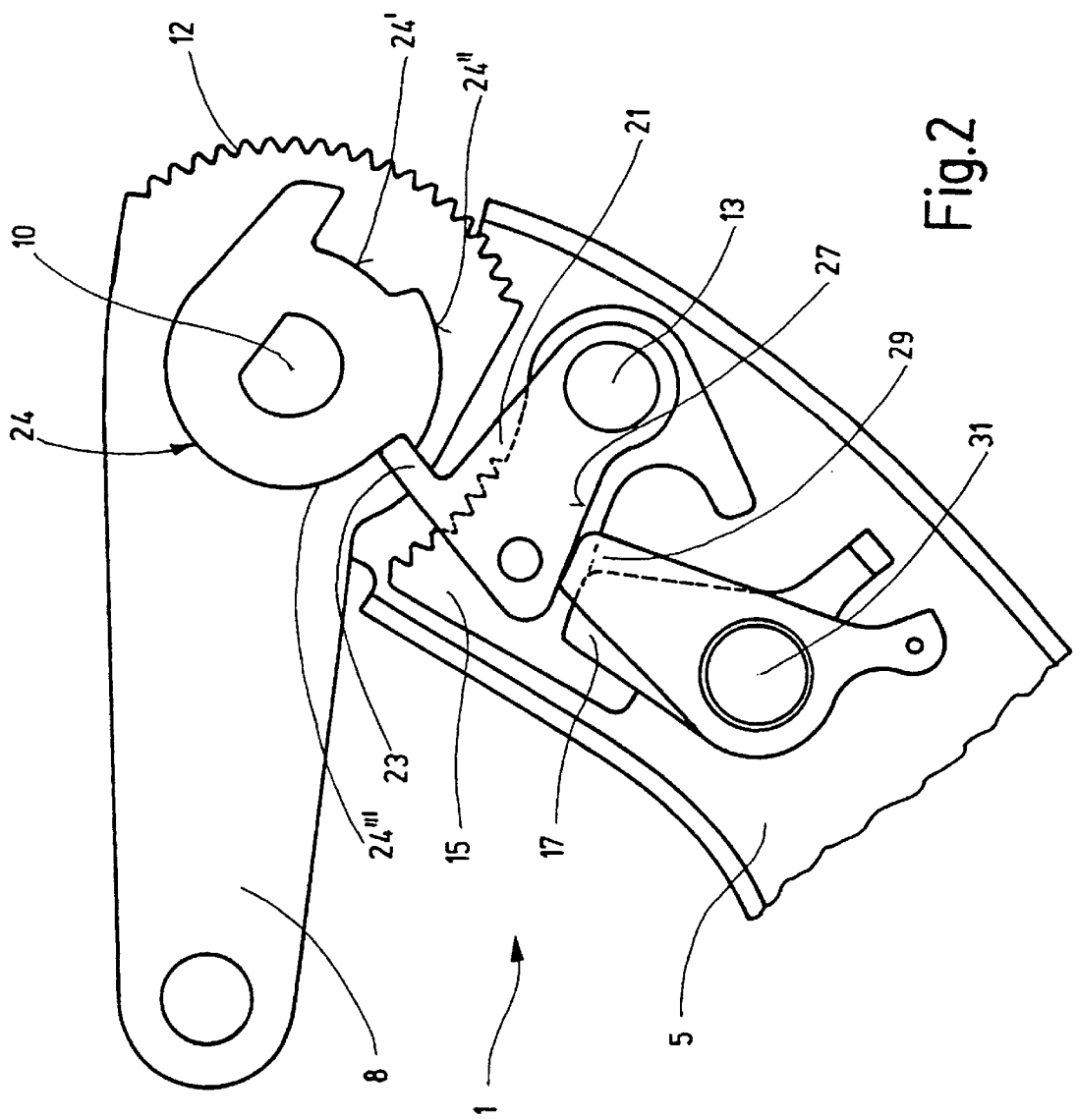
FIG. 2 is an illustration corresponding to FIG. 1 of the exemplary embodiment in the pivoted-forward state.

The exemplary embodiment relates to an articulated fitting 1 for a rear-seat bench 3 of a motor vehicle. The arrangement of the rear-set bench 3 in the motor vehicle and the normal direction of travel of the motor vehicle define the following directional details. The articulated fitting 1 is designed as a latching fitting. On both sides of the rear-seat bench 3, or, in the case of a design having a ⅓–⅔backrest, on both sides of the corresponding parts of the backrest 4, a respective articulated fitting 1 is provided by means of which the backrest 4 can assume a number of different backrest positions for the seat use, referred to below as seat positions, and a backrest position for the table function, referred to below as table position. Each articulated fitting 1 has a lower fitting part 5, which is attached fixedly to the seat-part structure of the rear-seat bench 3, and an upper fitting part 8, which is fastened fixedly to the structure of the backrest 4. The upper fitting part 8 is mounted rotatably in the lower fitting part 5 by means of a backrest bolt 10 as the axis of rotation, as a result of which the backrest 4 of the rear-seat bench 3 can be pivoted relative to the seat part of the rear-seat bench 3.

The upper fitting part 8 bears, at its lower end which faces away from the backrest 4, a toothed ring 12 concentrically with respect to the backrest bolt 10. On the lower fitting part 5, a detent pawl 15 is mounted pivotably on a pawl bolt 13 fixed to the lower part. The detent pawl 15 has a toothed arrangement which is approximately aligned with the backrest bolt 10 and can interact with the toothed ring 12 which is situated in the same plane. If the rear-seat bench 3 is situated in a seat position, the toothed ring 12 lies in the pivoting region of the detent pawl 15. At this inclination of the backrest 4, the spring-loaded detent pawl 15 has engaged with its toothed arrangement in the toothed ring 12 and thereby locks the articulated fitting 1. The toothed ring 12 extends over such a large angular region that a number of lockable seat positions, i.e. a number of inclinations of the backrest 4, are possible. The detent pawl 15 is secured by a pivotable intercepting component 17 in the event of a crash.

A control pawl 21 is mounted on the pawl bolt 13. The control pawl is arranged parallel with respect to the pivoting plane of the detent pawl 15 on the side facing away from the lower fitting part 5 and is connected in a rotationally fixed manner to the detent pawl 15. The control pawl 21 has a control tooth 23 which is arranged closer to the backrest bolt 10 than the toothed arrangement of the detent pawl 15. In the same plane as the control pawl 21, the upper fitting part 8 has, on the backrest bolt 10, a control plate 24 which has a smaller radius than the toothed ring 12. The control plate 24 is formed integrally with the upper fitting part 8, for example by embossing, or, depending on the application, is placed onto the upper fitting part 8 and is connected in a rotationally fixed manner to the latter.

As the control cam for the control tooth 23, the control plate 24 has, successively in the circumferential direction, an engagement section 24' set back radially, a radially projecting retaining section 24" which is adjoined thereto, and adjoining said retaining section in turn, a securing section 24''' set back radially. The transition from the retaining section 24"to the securing section 24''' is designed as a step-shaped, first stop 24''''. The flank which bounds the engagement section 24' and is arranged on the side facing away from the retaining section 24" is designed as a second stop 24'''''. The radius of the backrest bolt 10 to the outer edge of the second stop 24''''' is greater than the radius from the backrest bolt 10 to the retaining section 24". That flank of the control pawl 21 which faces away from the control tooth 23 in the circumferential direction is referred to below as the bearing surface 27. In order to secure the control: pawl 21, and therefore also the detent pawl 15, a spring-loaded clamping component 29 is provided which bears against the bearing surface 27 and is mounted on the same bearing bolt 31 as the intercepting component 17 in a manner such that it can rotate relative to the latter.

When, in a seat position, the detent pawl 15 has engaged in the toothed ring 12, the control tooth 23 is situated within the engagement section 24' without, however, bearing against the control plate 24 in the radial direction. This distance between the control tooth 23 and control plate 24 makes possible the unimpeded engagement of the detent pawl 15. The radial flanks of the engagement section 24' define the possible inclinations of the backrest 4, i.e. the possible angles of the upper fitting part 8 with the control plate 24 relative to the lower fitting part 5 with the control pawl 21. The second stop 24''''' determines the maximum possible rearward inclination of the backrest 4. In order to bring the rear-seat bench 3 into a flat "table position" with the backrest 4 arranged virtually horizontally, the articulated fitting 1 has to be unlocked and the backrest 4 pivoted forward. For this purpose, the intercepting component 17 is pulled back from the detent pawl 15 by an actuating cable (not shown). The intercepting component 17 carries along the clamping component 29 after crossing a certain angle. A projection which is correspondingly provided on the detent pawl 15 bounds, as an end stop, the possible pivoting region of the intercepting component 17. The detent pawl 15 is freed by pivoting of the clamping component 29.

By means of the movement exerted on the backrest 4 of the rear-seat bench 3 and on the basis of the tooth flank angle situated outside the self-locking region, the upper fitting part 8 can press back the detent pawl 15 via the toothed ring 12, with the result that the articulated fitting 1 is unlocked. The detent pawl 15 can also be carried along by further pulling on the intercepting component 17 and can thereby pivot in the opening direction. With the opening of the detent pawl 15, the control tooth 23 is at the same time pulled back out of the engagement section 24' and the control pawl 21 is pivoted away from the control plate 24. The upper fitting part 8 which is fixed to the backrest can now be pivoted forward. If the actuating cable on the intercepting component 17 is now let go of, then the clamping component 29 can pivot back on account of the spring loading, can carry along the intercepting component 17, and the control pawl 21 can pivot again toward the control plate 24. The control tooth 23 then bears against the retaining section 24", as a result of which engagement of the detent pawl 15 is prevented.

When the table position is reached, the control tooth 23 passes into the securing section 24''', as a result of which the control pawl 21 pivots somewhat further towards the control plate 24. The clamping component 29 passes as a result into its end position in which it secures the control pawl 21. By means of the bearing against the first stop 24'''', the control tooth 23 prevents the upper fitting part 8 together with the backrest 4 from pivoting back due to the pressure of the upholstery between the backrest 4 and seat part. The backrest 4 is thereby secured in the table position. For the transfer back into a seat position, the clamping component 29 has to be pivoted away from the control pawl 21 in a corresponding manner by means of the intercepting component 17, as a result of which the control pawl becomes disengaged from the control plate 24, so that the upper fitting part 8 can be pivoted back. As soon as the control tooth 23 has crossed the retaining section 24'' and is situated again in the engagement section 24', the detent pawl 15 can engage again. By means of its relatively large radius, the second stop 24'''' together with the control tooth 23 prevents the backrest 4 from pivoting too far to the rear, for example due to too much swing.

In the locked state of the articulated fitting 1, the clamping component 29 bears against the bearing surface 27 of the control pawl 21. The perpendicular with respect to the bearing surface 27 at the point of contact with the clamping component 29 produces a direction of force K (FIG. 1) of that force which is transmitted by the clamping component 29 to the control pawl 21 and therefore to the detent pawl 15. In the case of known fittings, this direction of force K points toward the bearing point of the upper fitting part 8, i.e. toward the backrest bolt 10, in order to set the toothed arrangement between the detent pawl 15 and toothed ring 12 in a play-free manner. In order also to eliminate the play caused by manufacturing tolerances in the bearing points of the upper fitting part 8 and of the detent pawl 15 and the control pawl 21, the perpendicular with respect to the bearing surface 27 points, according to the invention, past the point of contact on the backrest bolt 10, specifically in a manner which is turned further away from the connecting line between the backrest bolt 10 and pawl bolt 13 than if aligned with the bearing point of the upper fitting part 8. While the force component in the direction of the bearing point of the upper fitting part 8 furthermore sets the toothed arrangement in a play-free manner, the other alignment enables production of an additional force component which acts radially on the bearing point of the upper fitting part 8 and sets said bearing point in a play-free manner. The play in the bearing point of the two pawls 15 and 21 is also eliminated in a corresponding manner.

The intercepting component 17 is mounted on the bearing bolt 31 by means of an eccentric component 37. The eccentric component 37 has a profiled plate 39 whose hectagonal shape is derived from a regular hexagon by "cutting off" one corner. On the profiled plate 39, the eccentric component 37 has a bearing bushing 41 which serves for the mounting of the intercepting component 17. The eccentric component 37 is preferably of integral design. A central hole 43 penetrates the profiled plate 39 and the bearing bushing 41 in order to accommodate the bearing bolt 31. In this case, the center of the bearing bushing 41 does not coincide with the center of the central hole 43, but is arranged offset with respect thereto, i.e. eccentrically. The eccentric high point, i.e. that point in the circumferential direction of the eccentric component 37 which is furthest removed from the central hole 43, is marked on the profiled plate 39 by virtue of the fact that it lies opposite the "cut off corner". The eccentric component 37 is installed in such a manner that the profiled plate 39 is arranged on that side of the intercepting component 17 which faces away from the lower fitting part 5.

In order to compensate for or to reduce the loss in overlap in the toothed arrangement caused by manufacturing tolerances, i.e. the incomplete engagement of the toothed arrangement of the detent pawl 15 in the toothed arrangement of the toothed ring 12, during assembling with the detent pawl 15 engaged, the eccentric component 37 is rotated by means of the profiled plate 39. The eccentric component 37, and together with it the intercepting component 17, thereby execute an eccentric movement. The eccentric component 37 is rotated for a period sufficient to minimize the loss in overlap, and is then rotated back again somewhat.

An articulated fitting for a vehicle seat having a reclining position has, for example, a control plate which is of approximately mirror-inverted design, in which the engagement section, retaining section and securing section are arranged in a reverse sequence and the securing section is closed by a shoulder which corresponds in its radial dimensions to the previous, second shoulder 24''''. If the vehicle seat is to have both a table position and a reclining position, the control plate is correspondingly provided with additional sections for the angular regions to be crossed. In one such case, instead of the second shoulder 24'''', a subshoulder having an adjoining, second retaining section could be provided, which subshoulder has the same radius as the previous retaining section 24''. At the end of the second retaining section a further shoulder may be provided for limiting the maximum possible inclination, the shoulder corresponding in its radial dimensions to the previous, second shoulder 24''''. In a modified manner, an entry position for a backrest which has been pivoted freely, preferably in a two-door motor vehicle, is also possible. For this purpose, an individual receiving means for the control tooth is provided, for example, in the region of the retaining section 24''.

What is claimed is:

1. An articulated fitting which is mounted on a vehicle seat that includes a backrest the articulated fitting comprising:

an upper fitting part mounted to the backrest and pivotally mounted to a lower fitting part so that the backrest can rotate with the upper fitting part relative to the lower fitting part between at least one upright seat position and at least one other backrest position, with the backrest being at least generally upright in the upright seat position and the other backrest position being a table position, in which the backrest extends substantially horizontally, or a reclining position, in which the backrest is reclined, wherein one of the upper and lower fitting parts is a first fitting part and the other of the upper and lower fitting parts is a second fitting part;

a control cam provided on the first fitting part for interacting with a control element provided on the second fitting part so as to releasably secure the articulated fitting in the other backrest position; and a detent pawl pivotably mounted to the second fitting part for moving into a locking position in which the detent pawl releasably engages the first fitting part to releasably lock the articulated fitting in the upright seat position, wherein the control cam includes a first section that defines a void into which the control element extends during a range of scat positions that includes the upright seat position, the combination of the control cam and the control element does not substantially restrict movement of the backrest within said range of scat positions, and the combination of the control cam and the control element does restrict movement of the backrest from inside to outside of said range of seat positions.

2. An articulated fitting according to claim 1, wherein the first fitting part is the upper fitting part and the control cam is provided on a control plate mounted to the upper fitting part, wherein the control plate is mounted concentrically with respect to tire axis of rotation of the upper fitting part.

3. An articulated fitting according to claim 1, wherein the control element is arranged on the detent pawl and includes a control tooth for engaging the control cam.

4. An articulated fitting according to claim 3, wherein the control element is a control pawl which is connected to the detent pawl, and the control tooth is part of the control pawl.

5. An articulated fitting according to claim 1, wherein the control cam includes a second section designed so that the control element is associated with the second section during the other backrest position, with the combination of the control cam and the control element restricting movement of the backrest out of the other backrest position.

6. An articulated fitting according to claim 1, further comprising a clamping component movably mounted to the second fitting part for exerting a force that releasably secures the detent pawl in the position in which the detent pawl engages the first fitting part, so as to lock the articulated fitting in the upright scat position, with the force being directed in a direction which does not intersect and points past the axis of rotation of the first fitting part.

7. An articulated fitting according to claim 1, further comprising an intercepting component that is moveably and eccentrically mounted to the second fitting part for supporting the detent pawl in the locking position in the event of a crash.

8. An articulated fitting according to claim 7, further comprising rotating auxiliary means provided on the eccentric mounting of the intercepting component for setting the alignment of the eccentricity relative to the detent pawl.

9. An articulated fitting according to claim 1, wherein the articulated fitting is in combination with the vehicle seat such that the backrest is mounted to the upper fitting part for pivoting with the upper fitting part relative to the lower fitting part, and a base of the vehicle seat is mounted to the lower fitting part.

10. An articulated fitting which is mounted on a vehicle seat that includes a backrest, the articulated fitting comprising:
    an upper fitting part mounted to the backrest and pivotally mounted to a lower fitting part so that the backrest can rotate with the upper fitting part relative to the lower fitting part between at least one upright seat position, and at least one other backrest position with the backrest being at least generally upright in the upright seat position and the other backrest position being a table position, in which the backrest extends substantially horizontally, or a reclining position, in which the backrest is reclined, wherein one of the upper and lower fitting parts is a first fitting part and the other of the upper and lower fitting parts is a second fitting part;
    a control cam provided on the first fitting part for interacting with a control element provided on the second fitting part so as to releasably secure the articulated fitting in the other backrest position;
    a detent pawl pivotably mounted to the second fitting part for moving into a locking position in which the detent pawl releasably engages the first fitting part to releasably lock the articulated fitting in the upright seat position;
    an intercepting component that is moveably and eccentrically mounted to the second fitting part for holding The detent pawl in the locking position in the event of a crash; and
    rotating auxiliary means provided on the eccentric mounting of the intercepting component for setting the alignment of the eccentricity relative to the detent pawl.

11. An articulated fitting according to claim 10, wherein the control cam is provided on a control plate mounted on the first fitting part concentrically with respect to the axis of rotation of the first fitting part.

12. An articulated fitting according to claim 10, wherein the control element is arranged on the detent pawl and includes a control tooth for engaging the control cam.

13. An articulated fitting according to claim 12, further comprising a separate control pawl which is connected to the detent pawl, wherein the control tooth is formed on the control pawl.

14. An articulated fitting according to claim 10, further comprising a clamping component movably mounted to the second fitting part for exerting a force that releasably secures the detent pawl in the position in which the detent pawl engages the first fitting part, so as to lock the articulated fitting in the upright scat position, with the force being directed in a direction which does not intersect and points past the axis of rotation of the upper fitting part.

15. An articulated fitting according to claim 10, wherein the articulated fitting is in combination with the vehicle seat such that the backrest is mounted to the upper fitting part for pivoting with the upper fitting part relative to the tower fitting part, and a base of the vehicle seat is mounted to the lower fitting part.

16. An articulated fitting which is mounted on a vehicle scat that includes a backrest, the articulated fitting comprising:
    an upper fitting part mounted to the backrest and pivotally mounted to a lower fitting part so that the backrest can rotate with the upper fitting part relative to the lower fitting part between at least one upright seat position, and at least one other backrest position, with the backrest being at least generally upright in the upright seat position and the other backrest position being a table position, in which the backrest extends substantially horizontally, or a reclining position, in which the backrest is reclined, wherein one of the upper and lower fitting parts is a first fitting part and the other of the upper and lower fitting parts is a second fitting part;
    a control cam provided on the first fitting part for interacting with a control element provided on the second fitting part so as to releasably secure the articulated fitting in the other backrest position;
    a detent pawl pivotably mounted to the second fitting part for moving into a locking position in which the detent pawl releasably engages the first fitting part to releasably Jock the articulated fining, in the upright seat position;
    an intercepting component that is moveably and eccentrically mounted to the second fitting part for holding the detent pawl in the locking position in the event of a crash; and
    a bearing bolt extending through a bearing hole of the intercepting component, wherein the bearing hole of the intercepting component is eccentric with respect to the bearing bolt.

17. An articulated fitting according to claim 16, further comprising a clamping component that is pivotally mounted to the second fitting part by the bearing bolt.

18. An articulated fitting according to claim 11, further comprising an eccentric component mounted on the bearing bolt wherein the intercepting component is mounted on the eccentric component, the eccentric component extending through the bearing hole.

19. An articulated fitting which is mounted on a vehicle seat that includes a backrest, the articulated fitting comprising:
   an upper fitting part mounted to the backrest and pivotally mounted to a lower fitting part so that the backrest can rotate with the upper fitting part relative to the lower fitting part between at least one upright seat position, and at least one other backrest position, with the backrest being at least generally upright in the upright seat position and the other backrest position being a table position, in which the backrest extends substantially horizontally, or a reclining position, in which the backrest is reclined, wherein one of the upper and lower fitting parts is a first fitting part and the other of the upper and lower fitting parts is a second fitting part;
   a control cam provided on the first fitting part for interacting with a control element provided on the second fitting, part so as to releasably secure the articulated fitting in the other backrest position;
   a detent pawl pivotably mounted to the second fining part for moving into a locking position in which the detent pawl releasably engages the first fitting part to releasably lock the articulated fitting in the upright seat position; and
   an intercepting component mounted to the second fitting part for holding the detent pawl in the locking position in the event of a crash,
   wherein the control cam includes a first section that defines a void into which the control element extends during a range of seat positions that includes the upright seat position, in which the detent pawl is in the locking position, the combination of the control cam and the control element does not substantially restrict movement of the backrest within said range of seat positions, and the combination of the control cam and the control element does restrict movement of the backrest from inside to outside of said range of seat positions.

20. An articulated fitting according to claim 19, wherein the control cam includes a second section designed so that the control element is associated with the second section during the other backrest position, with the combination of the control cam and the control element restricting movement of the backrest out of the other backrest position.

* * * * *

UNITED STATES PATENT AND TRADEMARK OFFICE
CERTIFICATE OF CORRECTION

PATENT NO.   : 6,540,232 B2
DATED        : April 1, 2003
INVENTOR(S)  : Hänsel et al.

It is certified that error appears in the above-identified patent and that said Letters Patent is hereby corrected as shown below:

Column 6,
Line 35, after "backrest" insert a comma (,);
Lines 60 and 64, "scat" should read -- seat --.

Column 7,
Line 5, "tire" should read -- the --;
Line 22, "scat" should read -- seat --;
Line 66, "The" should read -- the --.

Column 8,
Lines 20 and 30, "scat" should read -- seat --;
Line 26, "tower" should read -- lower --;
Line 52, "Jock" should read -- lock --; "fining," should read -- fitting --;
Line 65, "claim 11" should read -- claim 16 --.

Column 9,
Line 19, after "fitting" cancel the comma (,);
Line 21, "fining" should read -- fitting --.

Signed and Sealed this

Twelfth Day of August, 2003

JAMES E. ROGAN
*Director of the United States Patent and Trademark Office*